(12) United States Patent
Reyna Fernandez

(10) Patent No.: US 11,349,848 B2
(45) Date of Patent: May 31, 2022

(54) EXPERIENCE FOR SHARING COMPUTER RESOURCES AND MODIFYING ACCESS CONTROL RULES USING MENTIONS

(71) Applicant: MICROSOFT TECHNOLOGY LICENSING, LLC, Redmond, WA (US)

(72) Inventor: Ricardo Reyna Fernandez, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/916,512

(22) Filed: Jun. 30, 2020

(65) Prior Publication Data

US 2021/0409416 A1   Dec. 30, 2021

(51) Int. Cl.
*H04L 29/06* (2006.01)
*H04L 9/40* (2022.01)
(Continued)

(52) U.S. Cl.
CPC .......... *H04L 63/104* (2013.01); *H04L 41/026* (2013.01); *H04L 51/046* (2013.01);
(Continued)

(58) Field of Classification Search
CPC ....... H04L 67/06; H04L 67/02; H04L 63/104; H04L 63/101; H04L 63/20; H04L 41/026;
(Continued)

(56) References Cited

U.S. PATENT DOCUMENTS

2013/0262574 A1  10/2013  Cohen
2017/0075919 A1*  3/2017  Bose ................... G06F 21/6245
(Continued)

OTHER PUBLICATIONS

"Change Access Permissions in Command Prompt", Retrieved From: https://www.virtualhelp.me/windows/691-change-access-permissions-in-command-prompt, Retrieved Date: Jul. 2, 2020, 4 Pages.

(Continued)

*Primary Examiner* — Jungwon Chang
(74) *Attorney, Agent, or Firm* — NovoTechIP International PLLC

(57) ABSTRACT

Various methods and systems for sharing computer resources and modifying access control rules for computer resources are described. An access control gesture may be defined using a command indicator comprising one or more identifying characters, symbols, or glyphs. For example, an access control gesture may be defined using an @-sign in combination with a modifier that indicates a particular security command to execute and/or a corresponding permission to add/modify/revoke. For example, an input string comprising a plus sign in combination with an @-sign (e.g., "+@") may indicate a command to add a mentioned user to an access control list. An input string comprising a minus sign, hyphen, or dash in combination with an @-sign (e.g., "-@") may indicate a command to remove a mentioned user from an access control list. As such, access control gestures can provide a simple and intuitive mechanism to grant temporary access to a designated resource.

20 Claims, 7 Drawing Sheets

(51) Int. Cl.
   *H04L 41/026* (2022.01)
   *H04L 51/046* (2022.01)
   *H04L 51/00* (2022.01)
   *H04L 65/403* (2022.01)

(52) U.S. Cl.
   CPC ............ *H04L 51/16* (2013.01); *H04L 63/101* (2013.01); *H04L 63/20* (2013.01); *H04L 65/403* (2013.01)

(58) Field of Classification Search
   CPC ..... H04L 51/046; H04L 51/16; H04L 65/403; G06F 21/6245; G06F 21/335
   See application file for complete search history.

(56) References Cited

U.S. PATENT DOCUMENTS

| | | | |
|---|---|---|---|
| 2017/0149906 A1* | 5/2017 | DeMaris | H04L 67/02 |
| 2017/0257406 A1* | 9/2017 | Wilde | H04L 67/06 |
| 2017/0353466 A1 | 12/2017 | Weaver et al. | |
| 2018/0152460 A1* | 5/2018 | Lin | G06F 21/335 |
| 2018/0210872 A1* | 7/2018 | Podmajersky | G06F 3/04886 |
| 2019/0258704 A1* | 8/2019 | Mertens | G10L 15/22 |
| 2021/0126805 A1* | 4/2021 | Archer | G06Q 10/101 |

OTHER PUBLICATIONS

"Now Avaiable: New Role Permissions For ©Mentions", Retrieved From: https://help.samanage.com/s/article/Now-Available-New-Role-Permissions, Aug. 20, 2019, 3 Pages.

"Use ©Mention in Comments to Tag Someone for Feedback", Retrieved From: https://support.microsoft.com/en-us/office/use-mention-in-comments-to-tag-someone-for-feedback-644bf689-31a0-4977-a4fb-afe01820c1fd?ui=en-us&rs=en-us&ad=us, Retrieved Date: Jul. 2, 2020, 5 Pages.

"International Search Report and Written Opinion Issued in PCT Application No. PCT/US2021/028734", dated Aug. 2, 2021, 10 Pages.

* cited by examiner

FIG. 2.

| ResourceId | ResourceValue |
|---|---|
| 1 | {"Timestamp": "1574066043", "ResourceData": {...}, "groupAcl": [A, B]} |
| 2 | {"Timestamp": "1574066043", "ResourceData": {...}, "groupAcl": [A]} |
| 3 | {"Timestamp": "1574066043", "ResourceData": {...}, "groupAcl": [A, C]} |
| 4 | {"Timestamp": "1574066043", "ResourceData": {...}, "groupAcl": [B, B]} |
| 5 | {"Timestamp": "1574066043", "ResourceData": {...}, "groupAcl": [C]} |
| 6 | {"Timestamp": "1574066043", "ResourceData": {...}, "groupAcl": [D]} |
| 7 | {"Timestamp": "1574066043", "ResourceData": {...}, "groupAcl": [X, Y]} |

*FIG. 4.*

EXPERIENCE FOR SHARING COMPUTER RESOURCES AND MODIFYING ACCESS CONTROL RULES USING MENTIONS

BACKGROUND

Computer-implemented technologies can help users to exchange computer resources (e.g., web links, documents, files, and the like). For example, MICROSOFT OFFICE makes sharing easy by providing a variety of ways to share files. In another example, communication group technologies (e.g., MICROSOFT TEAMS®) can facilitate the creation of communication groups such that users can exchange computer resources within communication groups. With a multitude of ways to share, it has become hard to track who has access to which computer resources. Moreover, once a particular resource has been shared, it can be challenging to unshare the resource, as removing access is generally an involved process. In some cases, once a computer resource has been distributed, it may not be possible to remove access anymore. As a result, in many cases, sharing technologies do not provide users with sufficient control over shared computer resources.

SUMMARY

Embodiments described herein provide methods and systems for sharing computer resources and modifying access control rules for computer resources. At a high level, one or more access control gestures may be defined using a command indicator that includes one or more identifying characters, symbols, glyphs, or the like. For example, an access control gesture may be defined using a character that indicates a mention (e.g., @) in combination with a modifier that indicates a particular security command to execute and/or a corresponding permission to add/modify/revoke. For example, an input string comprising a plus sign in combination with an @-sign (e.g., "+@") may indicate a command to add a mentioned user to an access control list. In another example, an input string comprising a minus sign, hyphen, or dash in combination with an @-sign (e.g., "-@") may indicate a command to remove a mentioned user from an access control list.

Access control gestures provide a simple and intuitive mechanism for users to grant temporary access to a particular resource. Taking embodiments that use +@ and -@ for command indicators as an example, @mentions may be used to rapidly grant and remove access, such as in the context of chat sessions or document comments. For example, a user may +@mention ("plus at mention") a recipient to provide access to the recipient, and once the reason for sharing the resource has been fulfilled and the user wants to return to a more private state, the user may -@mention ("minus at mention") the recipient to remove access. This extension of @mentions, and more generally the use of access control gestures, can serve as a shortcut that enables users to modify access control rules easily, without the need to navigate to the conventional "share" menu. This provides an efficient mechanism that lets users quickly control who gets access, while enabling users to remove access just as quickly.

As such, access control gestures may be used to share computer resources and modify access control rules. Generally, the present techniques provide a new way to grant and remove access to files and other resources, for example, by allowing users to embed detectable access control gestures into communications (e.g., chat sessions, comments, etc.) that include contextual information (e.g., about a document), without breaking up the creation workflow. As such, the present techniques serve users' needs to remain in control over which parts of the content creation process and the final product are shared, to whom, and when.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 2 is an illustration of an example user interface for modifying access control rules using a group chat, in accordance with embodiments described herein;

FIG. 4 is an illustration of an example resource table that may govern access to computer resources, in accordance with embodiments of the present disclosure;

DETAILED DESCRIPTION

Overview

Figure 1:
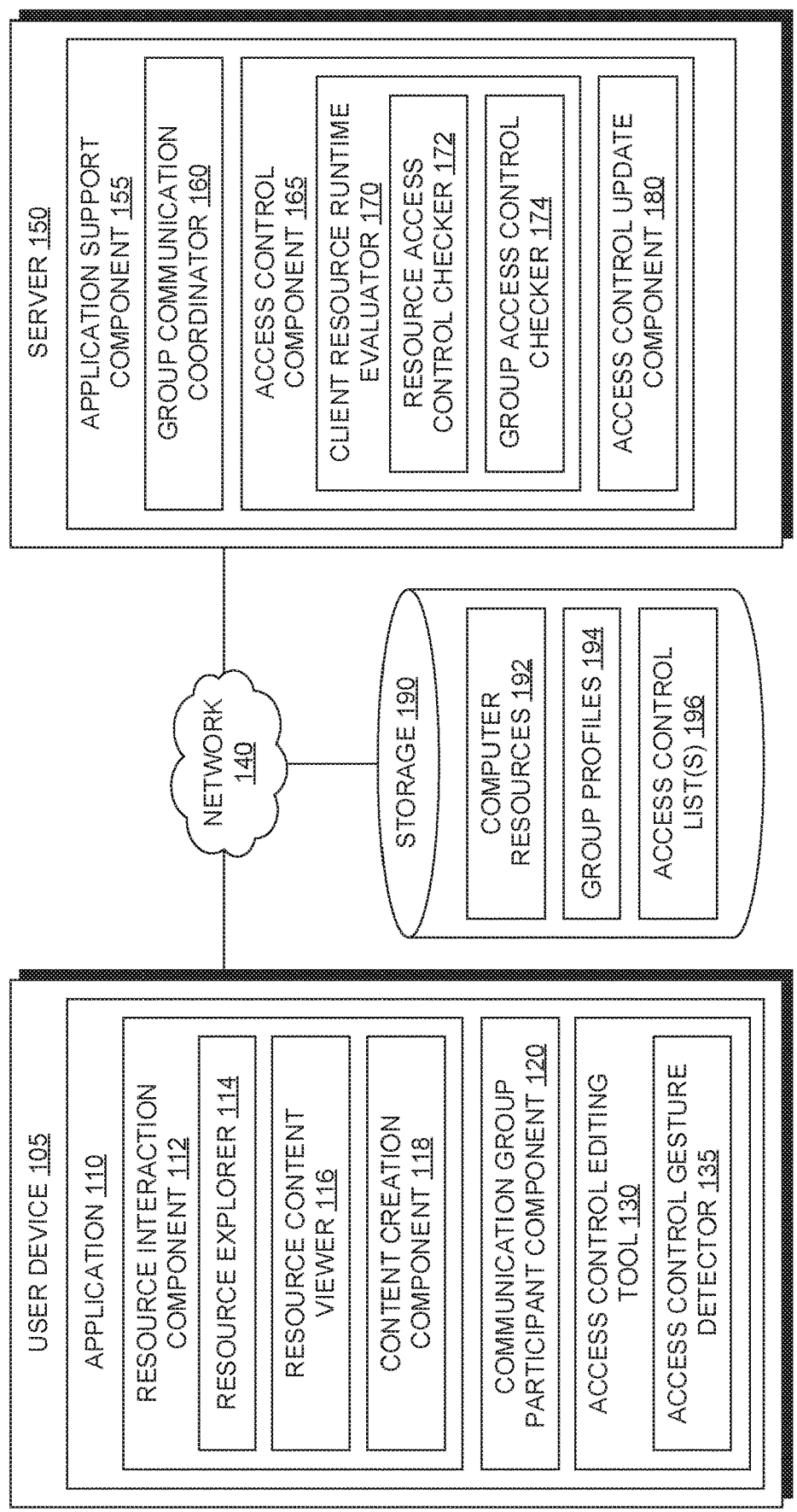
FIG. 1 is a block diagram of an example resource sharing environment, in accordance with embodiments described herein.

Current computer-implemented technologies provide a variety of ways to share computer resources such as web links, documents, files, and the like. For example, users can share cloud-based files by providing a link to the location where the files are stored, so recipients can use the link to access the files. In some cases, the link itself is sharable to other downstream recipients, so one recipient could potentially forward the link to another recipient, and so on. However, this type of sharing has a degree of finality. Once a file has been downloaded, control over the file has been diminished or even lost entirely. Furthermore, in some cases, the nature of a particular business or the nature of a particular resource may require more stringent access control, so it may not be desirable to grant blanket access for any user to access a particular resource, for example, via a sharable link.

The primary conventional alternative is to generate a secure link that only works for specific users. For example, some programs allow users to share files by entering a list of recipients in a sharing dialog box. However, navigating to that dialog box can be cumbersome and breaks up the creation workflow, introducing workflow inefficiencies. Similarly, removing a particular recipient's access is also cumbersome and can interfere with creative efficiency. As a result, existing technologies unnecessarily consume computing resources, such as memory, CPU, and network resources, among other things. Furthermore, for many users, removing access is challenging or impractical, which makes conventional sharing techniques feel permanent. As such, even using a secure link, control over shared files is diminished or even lost in conventional technologies.

Some content creation tools, such as those available through MICROSOFT OFFICE, support the user of an "@mention" in comments to tag someone for feedback. An @mention ("at mention")—also known simply as a mention—is a reference or link to a user's profile. For example, if a MICROSOFT OFFICE user includes a comment in a document, presentation, or spreadsheet, and uses the @-sign with someone's name, the person that was mentioned receives an e-mail with a link to the comment. However, if a user tries mentioning someone who does not already have full access to the file, after pressing send, a dialog box is displayed, alerting the commenting user that the @mentioned user does not have access, and asking the commenting user if he or she wants to share the file and notify the person being @mentioned. This technique has the similar drawbacks as those described above: granting and removing access can be cumbersome, requires multiple interface interactions, and breaks up the creation workflow. Users currently lack a quick way to temporarily grant access to and remove access from another user, for example, for a brief consultation that does not require full or permanent access.

As such, various embodiments described herein provide simple and efficient methods and systems for sharing computer resources and modifying access control rules. At a high level, one or more access control gestures may be defined using a command indicator comprising one or more identifying characters, symbols, glyphs, or the like. For example, an access control gesture may be defined using a character that indicates a mention (e.g., @) in combination with a modifier that indicates a particular security command to execute and/or a corresponding permission to add/modify/revoke. For example, an input string comprising a plus sign in combination with an @-sign (e.g., "+@") may indicate a command to add a mentioned user to an access control list. In another example, an input string comprising a minus sign, hyphen, or dash in combination with an @-sign (e.g., "-@") may indicate a command to remove a mentioned user from an access control list.

In some embodiments, an access control gesture may include syntax that enables inputs defining one or more arguments of an associated command. For example, a string that follows a command indicator may be interpreted as an identifier of a user profile for the user to add or remove from the access control list. In some embodiments, arguments may be identified from an associated input string, contextually (e.g., a selected file or document being viewed may be interpreted as a file or document for which access control should be modified), based on one or more defaults (e.g., temporarily grant access for some pre-determined duration), based on selections from one or more associated menus or other interaction elements (e.g., a pop-up tool triggered by detection of a gesture or portion thereof), and/or the like. As such, access control gestures may be used to rapidly grant and remove access to computer resources in various ways, such as in the content of chat sessions or document comments.

In some embodiments, an access control gesture may be detected from an input string entered into an application such as an application that hosts a communication group or a content creation application. For example, a communication group application (e.g., MICROSOFT TEAMS) may host a communication group such as a chat group, channel, thread, or other collection of messages or posts, and the communication group application may detect access control gestures from input strings entered into the communication group. In another example, a content creation application (e.g., MICROSOFT WORD, MICROSOFT EXCEL®, MICROSOFT POWERPOINT®) may detect access control gestures from input strings entered into documents comments. Generally, natural language processing (NLP), text matching (e.g., using a search pattern such a regular expression), and/or other techniques may be used to monitor a class of inputs (e.g., textual inputs such as inputs into chat sessions or document comments) and/or detect an access control gesture from the monitored inputs (e.g., a command indicator, associated arguments).

In some embodiments, in response to detecting a particular access control gesture or some portion thereof (e.g., a command indicator, a command indicator plus at least one argument such as a user profile), one or more arguments may be identified. Generally, arguments may be identified from an associated input string, contextually, based on one or more defaults, based on selections from one or more associated menus, and/or the like. Arguments may be required for the gesture to be complete (e.g., what to share, who to share with) or optional (e.g., a time limit on sharing). In some cases, arguments and/or corresponding sharing properties may be displayed and/or selected in pop-up tool, which may be triggered upon detecting a particular access control gesture (or portion thereof). These are just a few examples, and other ways of inputting and/or detecting arguments may be implemented within the scope of the present disclosure.

By way of nonlimiting example, one possible argument for an access control gesture is an associated computer resource (e.g., to share or stop sharing), or portion thereof. Generally, a "computer resource" or "resource" may be any set of data that can be stored, accessed, and/or referenced in computer memory. For example, a computer resource may be a file, document (e.g., a MICROSOFT WORD document), a web resource (e.g., a web page or web application), a computer object (e.g., a variable, data structure, function, data object, and/or value), and/or other items. An access control gesture may identify an associated computer resource expressly (e.g., via an input argument supplying an identification or location of the resource), contextually (e.g., by having a particular document open, active, selected, or otherwise identified), or otherwise.

In some embodiments, a user may opt to share a portion of a particular document or other resource, as opposed to the entire document. In situations where a user intends to share less than an entire resource, an access control gesture may accept an argument indicating an intent to share a portion of a resource (e.g., via a pop-up tool triggered by detection of a gesture or portion thereof). In this example, the portion of a computer resource to share may be indicated in any suitable manner (e.g., selected or otherwise designated text, sections, pages, slides, and/or the like). To facilitate sharing only an identified portion of a particular resource, various techniques may be applied. In some cases, the resource with the shared content may be segmented and access control rules may be applied to each segment. In another example, a new resource (e.g., a temporary file) that includes only the identified shared content may be generated, and access to the new resource may be granted. Generally, upon detecting an indication of an intent to share less than an entire resource, a representation of an identified portion of the resource (e.g., an identification of a shared segment or a new resource with the shared content) may be used as an argument for what to share.

Generally, completion of an access control gesture may be indicated in a variety of ways. Some nonlimiting examples include sending a message that includes the access control gesture to a communication group, exiting a document or other file comment that adds the access control gesture, completing entry of an argument of the access control gesture, receiving an input from an associated interaction element confirming completion of the access control gesture, and/or others.

In response to detecting completion of an access control gesture, a corresponding security command may be executed by generating or updating one or more access control rules for an associated computer resource. For example, access control rules may be represented by a resource table or some other data structure(s) that maps computer resources to a representation of corresponding access control rules. In some cases, the access control rules may take the form of an access control list ("ACL") that indicates one or more particular access control levels needed to access a particular resource or group of resources. In some embodiments, an ACL may identify an authorized individual (e.g., a name of a person), an authorized user (e.g., a particular service or end user), and/or a security group(s) whose members have access to a corresponding resource(s). In some embodiments, upon detecting completion of an access control gesture, a corresponding resource table and/or access control list may be identified and updated to implement the security command represented by the access control gesture (e.g., share or unshare a file). In some embodiments, a dashboard may present a representation of the people or accounts with current access, reinforcing the feeling of control over who has access.

In some cases, there may be different access control rules governing access to a particular resource (or group of resources). For example, different types of people in an organization may be permitted to access different types of information or perform different types of operations on information, for example, based on their role, qualifications, or other criteria. Access-controlled data may be rendered or otherwise provided to certain permitted users through the use of access-control management functionality. Access-control management refers to a technology infrastructure that restricts access to particular resources (e.g., files, applications, documents, changes in network settings, and the like) through policies indicating who or what has specific privileges to such resources. Particular individuals or groups may be "privileged" because they have the authority to make administrative changes or have other access rights (e.g., a read-only view privilege) to a resource, while others do not have such rights. For example, access-control management functionality can include restricting access of a particular application to a few select individuals (e.g., an administrator and a Chief Financial Officer) based on the individuals' company role irrespective of the communication group. As such, in some embodiments, each ACL may include some indication of one or more access control levels for which users assigned to one of the levels are authorized to access a corresponding resource(s). For example, each ACL may include one or more access control level identifiers corresponding to one or more access control levels. These are just a few examples, and other ways of implementing and updating access control rules are contemplated within the scope of the present disclosure.

One of the benefits of certain embodiments is the ease with which a user may grant temporary access to a particular resource. Taking embodiments that use +@ and -@ for command indicators as an example, @mentions may be used to rapidly grant and remove access, such as in the context of chat sessions or document comments. For example, a user may +@mention ("plus at mention") a recipient to provide access to the recipient, and once the reason for sharing the resource has been fulfilled and the user wants to return to a more private state, the user may -@mention ("minus at mention") the recipient to remove access. Essentially, this extension of @mentions, and more generally the use of access control gestures, can serve as a shortcut that enables users to modify access control rules easily, without the need to navigate to the conventional "share" menu. This provides an efficient mechanism that lets users quickly control who gets access, while enabling users to remove access just as quickly. As a result, access control gestures can reduce the number of clicks and corresponding consumption of computing resources (e.g., memory, CPU, network resources) otherwise required to share and remove access to computer resources. Furthermore, by providing a shortcut to modify access control rules, access control gestures can make a user's interactions with the computer more efficient. In embodiments where access control gestures are incorporated into the creation workflow (e.g., available through content creation applications), access control gestures can reduce or even eliminate the need to break up the creation workflow. For example, access control gestures can eliminate the need to navigate away from an active document or canvas, making it easier for users to reengage with the work they were doing before using an access control gesture. These are just some of the benefits that may result from the various techniques described herein.

As such, access control gestures may be used to share computer resources and modify access control rules. Generally, the present techniques provide a new way to grant and remove access to files and other resources, for example, by allowing users to embed detectable access control gestures into communications (e.g., chat sessions, comments, etc.) that include contextual information (e.g., about a document), without breaking up the creation workflow. Furthermore, access control gestures can reduce the demand on a user's cognitive load, increasing ease of use. This is particularly true in embodiments with access control gestures that use @mentioning, as these access control gestures leverage the increasing familiarity of software users with @mentioning to call for someone's attention. As such, the present techniques serve users' needs to remain in control over which parts of the content creation process, as well as the final product, are shared, to whom, and when.

Example Resource Sharing Environment

Referring now to FIG. 1, a block diagram of an example environment 100 suitable for use in implementing embodiments of the invention is shown. Generally, environment 100 is suitable for sharing computer resources and modifying access control rules for computer resources. Environment 100 includes user device 105 and server 150. User device 105 and/or server 150 may be any kind of computing device capable of facilitating resource sharing and/or modification of access control rules. For example, in an embodiment, user device 105 and/or server 150 may be a computing device such as computing device 700, as described below with reference to FIG. 7. Generally, user device 105 and/or server 150 may be a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Environment also includes storage 190. Storage 190 generally stores information including data, data structures, computer instructions (e.g., software program instructions, routines, or services), and/or models (e.g., machine learning models) used in some embodiments of the technologies described herein. In an embodiment, storage 190 comprises a data store (or computer data memory). Further, although depicted as a single data store component, storage 190 may be embodied as one or more data stores (e.g., a distributed storage network) or may be in the cloud.

The components of environment 100 may communicate with each other via a network 140, which may include, without limitation, one or more local area networks (LANs) and/or wide area networks (WANs). Such networking environments are commonplace in offices, enterprise-wide computer networks, intranets, and the Internet.

Generally, any of the elements illustrated in FIG. 1 (e.g., access control editing tool 130, access control update component 180) may be incorporated, or integrated, into one or more applications executable on one or more devices, or an add-on(s) or plug-in(s) to an application(s). The application(s) may generally be any application capable of facilitating resource sharing and/or modification of access control rules, and may be a stand-alone application, a mobile application, a web application, or the like. Some example applications that may be used include communication group applications (e.g., MICROSOFT TEAMS, MICROSOFT SHAREPOINT®), content creation applications, such as those available through MICROSOFT OFFICE (e.g., MICROSOFT WORD, MICROSOFT EXCEL, MICROSOFT POWERPOINT), and/or others. In some implementations, the application(s) comprises a web application, which can run in a web browser, and could be hosted at least partially serverside. Additionally or alternatively, the application(s) may comprise a dedicated application. In some cases, the application(s) may be integrated into an operating system (e.g., as a service).

Generally, any allocation of functionality may be implemented across any number of devices. In the example illustrated in FIG. 1, application 110 may be hosted at least partially server-side, such that application 110 and application support component 155 may coordinate (e.g., via network 140) to perform the functionality described herein. In another example, application 110 and application support component 155 (or some portion thereof) may be integrated into a common application executable on a single device. Although embodiments are described with respect to an application(s), generally any of the functionality described herein may additionally or alternatively be integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

In the example illustrated in FIG. 1, application 110 includes resource interaction component 112. Depending on the type of application, resource interaction component 112 may provide various types of functionality that allow user to interact with resources in various ways. For example, some applications (e.g., some communication group applications) may allow users to browse resources (e.g., for sharing), but not view or edit their contents. Other applications may allow users to browse and view the contents of resources, but not edit the contents. Still other applications (e.g., content creation applications) may allow users to browse, view, and edit. Thus, depending on the type of application, resource interaction component 112 may include one or more of resource explorer 114, resource content viewer 116, and/or content creation component 118. Generally, resource explorer 114 may provide an interface (e.g., a graphical user interface) with navigational tools that accept inputs that browse and select available resources (e.g., resources that are local to user device 105, resources available via network 140 such as computer resources 192 of storage 190). Resource content viewer 116 may read the contents of a selected resource, and provide an interface (e.g., a graphical user interface) that displays the content and provides tools that accept inputs that navigate and/or browse the content. Content creation component 118 may read the contents of a selected resource and provide an interface (e.g., a graphical user interface) that displays the content and provides various tools for generating and/or editing content. Any known techniques may be used to browse, select, display, navigate, edit, generate, and/or otherwise interact with computer resources, or some portion thereof.

In some embodiments, application 110 may be associated with one or more corresponding applications or services available on one or more other user devices and/or in the cloud. For example, in one embodiment, application 110 may coordinate with other user devices (e.g., via application support component 155) to manage the presentation of content across multiple user devices associated with a particular user.

In the example illustrated in FIG. 1, application 110 includes communication group participant component 120. Generally, communication group participant component 120 may coordinate with application support component 155 (e.g., via network 140) to manage a communication group, for example, by distributing messages, posts, comments, and the like to user devices of members of the group. Depending on the type of application, communication group participant component 120 and/or application support component 155 may provide different types of functionality, such as hosting a chat group, channel, thread, or other collection of messages or posts. In another example, communication group participant component 120 may accept comments on a shared resource (e.g., a shared document), or on a selected portion of a shared resource, and communication group participant component 120 and/or application support component 155 may coordinate to distribute the comments to user devices of users with whom the resource has been shared.

In some embodiments, a communication group may be implemented using a computerized group container. A "computerized group container" as described herein is a container that is configured to store shared data (e.g., one or more electronic messages, document comments) exchanged between a plurality of participants of a group. Many cloud scale services are built on top of data layers which scale horizontally by spreading data across management units, known as shards. Each management unit controls a subset of a total data corpus. When a group is formed, a group shard may be created corresponding to the computerized group container or communication group. For example, a computerized group container or communication group may correspond to a MICROSOFT TEAMS channel, team, or group, a MICROSOFT SHAREPOINT group, a MICROSOFT YAMMER® group, a social network of friends or acquaintances (e.g., FACEBOOK), a chat group, or any suitable container where users can share and access messages, threads, posts, comments, and/or the like. In some cases, a computerized group container may correspond with a shared computer resource (e.g., computer resources 192 of storage 190) such as a shared document in which a group of users may access, review, modify, comment, approve, or otherwise interact with the shared file.

Generally, application support component 155 of server 150 may facilitate various types of functionality associated with application 110 and/or communication groups. In the embodiment illustrated in FIG. 1, application support component 155 includes group communication coordinator 160 and access control component 165.

Group communication coordinator 160 may manage one or more group profiles 194 (e.g., residing on storage 190), and may be responsible for determining and/or detecting group events (e.g., group creation, messages within a group, updates to shared documents such as new comments), and/or coordinating distribution of updates to shared resources within the group. For example, group communication coordinator 160 may receive an indication that a computerized group container has been formed (e.g., via a user forming a group, requesting to form a group, or creating a shared document via application 110), and in response, group communication coordinator 160 may generate or update a corresponding group profile 194, access control list(s) (ACL (s)) 196, and/or the like. Generally, group profile 194 may include information about group participants or members, personal preferences, and/or the like. For example, group profile 194 may include preferences and corresponding settings (e.g., personal and/or group), such as monitoring settings (e.g., categories of events to be monitored or not monitored), notification preferences, and/or the like. Group profile 194 may be configurable (e.g., via application 110) to control the manner in which group communication coordinator 160 monitors and/or notifies group members of group events. In some embodiments, group communication coordinator 160 may monitor user activity associated with a particular communication group, record or compile a representation of activity associated with the group (e.g., including recording a clock time at which group events occur), and/or coordinate distribution of updates to shared resources within the group.

In some embodiments, a user may request to access a particular computer resource (e.g., one of computer resources 192), for example, by navigating a file structure using resource interaction component 112 to identify a particular computer resource and generate a request to access control component 165 of server 150 to access the computer resource. Generally, access control component 165 may evaluate the request to determine whether or not to grant access. If access is determined to be authorized, access control component 165 may provide access (or otherwise enable application support component 155 to provide access). If access is determined to be unauthorized, access control component 165 and/or application support component 155 may deny access.

To determine whether or not the requested access is authorized, client resource runtime evaluator 170 of access control component 165 may consult one or more access control list(s) 196. The client resource runtime evaluator 170 may be responsible for at least partially executing a runtime query or request of a user to access a particular computer resource, and returning the computer resource based on the user's access credentials. Generally, a request may be a request to access a particular computer resource (e.g., discussed in a group), a request for access to a group (or a group event), and/or a request to access certain features (e.g., a "resources" tab or container that lists computer resources) of a group. To accomplish this, client-resource runtime evaluator 170 may compare the requesting user's access credentials (represented or otherwise communicated by the request) with a corresponding ACL(s) 196 governing access to the computer resource. Generally, an ACL may indicate one or more particular access control levels needed to access a corresponding resource. Each access control level may identify or otherwise represent an authorized individual (e.g., a name of a person), an authorized user (e.g., a particular service or end user), and/or a security group(s) whose members have access to a corresponding resource(s). In some embodiments, each ACL 196 may include one or more access control level identifiers corresponding to one or more access control levels.

In the embodiment illustrated in FIG. 1, client resource runtime evaluator 170 includes resource ACL checker 172 and group ACL checker 174. Resource ACL checker 172 may be responsible for determining whether a requesting user has access to one or more corresponding resources (or instances, segments, properties, and/or other aspects of a resource) based on comparing the user's access credentials to one or more ACLs governing access to the computer resource. For example, in order to access a first computer resource, the ACL may indicate "[Jane Doe; John Doe]," where "Jane Doe" is a first access control level identifier and "John Doe" is a second access control level identifier. This ACL may indicate that in order to access the first resource, the requesting user must need to be Jane Doe or John Doe. Additionally or alternatively, some embodiments may associate computer resources with a particular group access control level needed to access a particular computer resource such that any user that does not meet the group access control level is not a member of the group and/or is prevented from accessing the computer object. For example, in order to access a first computer resource, a corresponding ACL may indicate "[security group A; security group B]," where "security group A" is a first access control level identifier and "security group B" is a second access control level identifier. This ACL may indicate that in order to access the first computer object, the requesting user must need to be a member of "security group A" (e.g., a first MICROSOFT TEAMS channel) and/or "security group B" (e.g., a second MICROSOFT TEAMS channel). As such, when a user requests access to a computer resource, some embodiments may only return computer resource (or aspects thereof) that the user has access to by comparing the user's access credentials with the one or more access control level identifiers. Accordingly, different queries by different users may return and/or render different information, depending on the access credentials of the users. Accordingly, for example, if the user does not have access to an entire computer resource, resource ACL checker 172 (and/or group ACL checker 174) may identify, modify, and/or generate an associated resource comprising only a portion(s) of the computer resource the user is permitted to access (e.g., by removing one or more portions of the computer resource).

Group ACL checker 174 may be responsible for determining whether a requesting user has access to one or more group features (e.g., chat groups, channels, threads, some other collection of messages or posts, shared documents or other computer resources of a group within a group) based on comparing the user's access credentials to one or more group ACLs governing access to the group and/or a corresponding group feature. In some embodiments, a group ACL governing access to a group or group feature may be different from an ACL governing access to a corresponding resource. For instance, users may be members of a particular group but do not have access to a particular resource shared within the group. In another example, users may have access to a particular computer resource, but they may not be part of a particular group. As such, in some embodiments, both ACLs may be checked.

In some embodiments, group ACL checker 174 and/or resource ACL checker 172 may determine whether users have subscribed to a particular service or resource (e.g., a subscription). In some embodiments, group ACL checker 174 and/or resource ACL checker 172 may prevent access if a particular user is not a subscriber to the subscription. Subscriptions or licenses to such subscriptions can be purchased, in some instances. For example, the subscription may correspond to purchase of application set (e.g., MICROSOFT 365), a purchase of subscription to a set of tools (e.g., encryption engines), and/or the like.

In some embodiments, one or more access control gestures may be used to share computer resources and/or modify access control rules. In the example illustrated in FIG. 1, access control editing tool 130 may detect an access control gesture from an input string (e.g., entered into an interface provided by application 110), and access control editing tool 130 may coordinate with access control update component 180 to execute a corresponding security command, for example, by generating or updating one or more ACL(s) 196 for an associated computer resource.

In the embodiment illustrated in FIG. 1, access control editing tool 130 includes access control gesture detector 135. Generally, access control gesture detector 135 may detect an access control gesture, which may be input into an interface provided by application 110. In some embodiments, access control gesture detector 135 may perform a monitoring or listening function, for example, on a class of inputs (e.g., textual inputs, inputs into a particular field or pane, inputs entered into chat sessions or document comments). As such, access control gesture detector 135 may listen for or otherwise be triggered by a particular class of input, and responsively evaluate the input to determine whether the input includes an access control gesture.

Access control gesture detector 135 may detect an access control gesture in any suitable manner, which may depend on the definition and/or syntax of the gesture. For example, one or more access control gestures may be defined using a command indicator comprising one or more identifying characters, symbols, glyphs, or the like (e.g., an @-sign) in combination with (e.g., adjacently preceded by) a modifier that indicates a particular security command to execute such as a plus sign (e.g., indicating a command to add a user to an access control list), a minus sign, hyphen, or dash (e.g., indicating a command to remove a user to an access control list), and/or others. In some embodiments, syntax of an access control gesture may define how one or more arguments may be accepted or otherwise specified (e.g., who to share/unshare with, what to share/unshare, shared user rights, time limit, notification properties). In some embodiments, arguments may be identified from an associated input string (e.g., an @mentioned user name), contextually (e.g., a selected document, active document, or document being viewed in application 110 may be interpreted as a document to share), based on one or more defaults (e.g., temporarily grant access for some pre-determined duration), based on selections from one or more associated menus or other interaction elements (e.g., a pop-up tool triggered by detection of a gesture or portion thereof), and/or the like. These and other types of syntax are contemplated within the present disclosure.

In some embodiments, access control gesture detector 135 may detect an access control gesture or portion thereof (e.g., a command indicator, modifier, one or more arguments, and/or the like) from an input text string using natural language processing (NLP), text matching (e.g., using a search pattern such a regular expression), and/or other techniques. For example, in some embodiments, NLP functionality may be used within a class of inputs (e.g., group events such as messages, chats, posts, threads, shared document comments) to detect access control gestures. For example, a NLP module may break or tokenize character sequences, join or concatenate other character sequences (e.g., semantically similar words), and/or tag (e.g., part-of-speech) tokenized character sequences. In this way, textual inputs may be parsed into constituent words, some or each of the words may be tagged with a part-of-speech identifier, and any number of rules may be applied to analyze a textual message (e.g., based on word and/or POS order). In some embodiments, NLP may be configured to recognize keywords or character strings from some or all of a textual input. Additionally or alternatively, access control gesture detector 135 may detect access control gestures in some other manner, such as using one or more machine learning models (e.g., Siamese neural networks, random forests, convolutional neural networks (CNN), and/or others), which may be trained to predict future access control gestures using historical labeled access control gestures. These are just a few examples, as these and other detection techniques may additionally or alternatively be applied.

Figure 2:
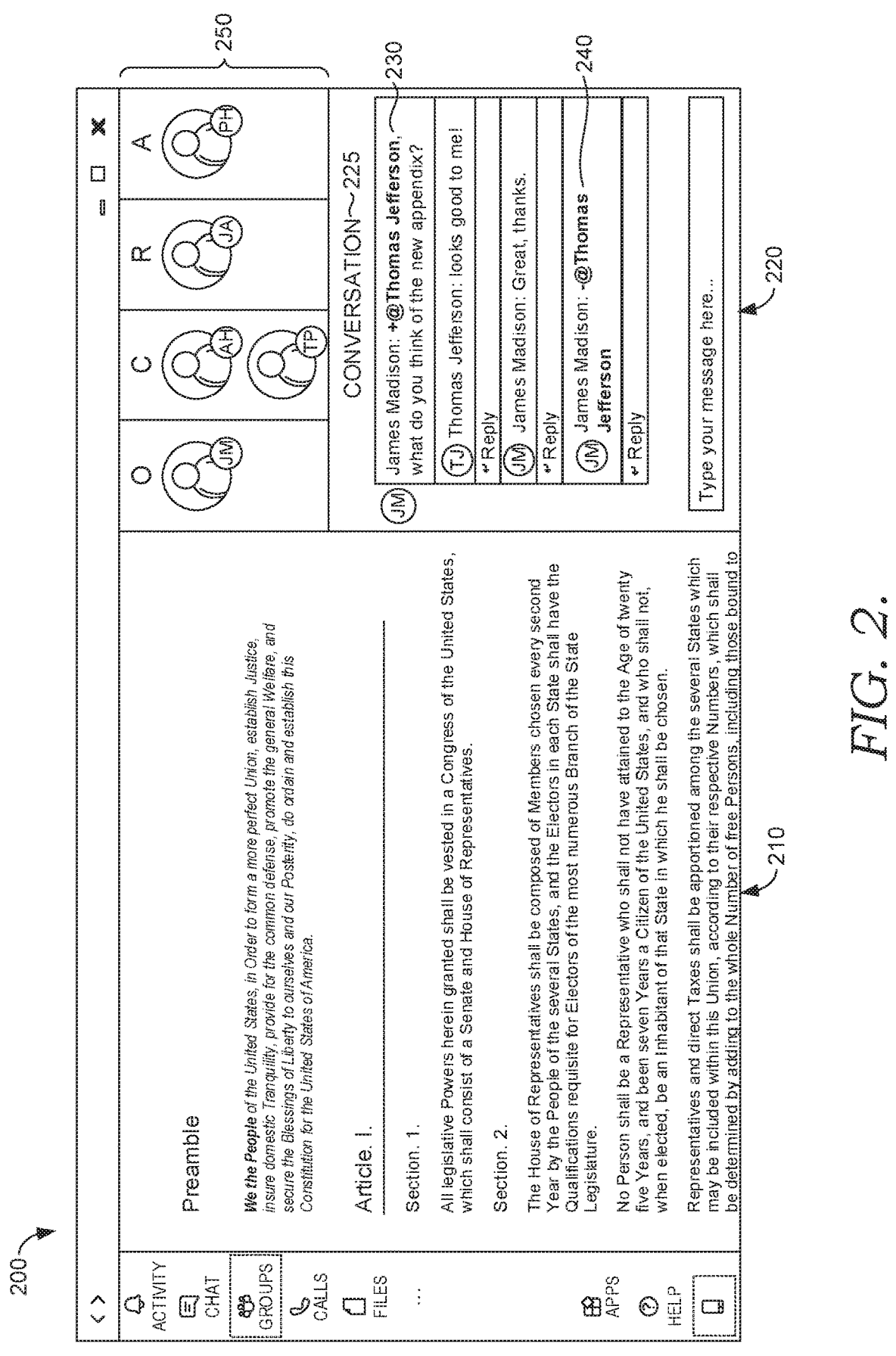

Turning now to FIG. 2, is an illustration of an example user interface 200 for modifying access control rules using a group chat, in accordance with embodiments described herein. Generally, user interface 200 may be provided by an application such as application 110 of FIG. 1, which may in some embodiments correspond to MICROSOFT TEAMS. In FIG. 2, user interface 200 includes a viewer pane 210 configured to view (and/or edit) the contents of a selected resource (e.g., a file, document, web page, slide show, and/or the like). In this embodiment, user interface 200 also includes shared users dashboard 250 indicating which users or accounts have access to the active resource being viewed in viewer pane 210. In some cases, privileges may be categorized into different access control levels, which may correspond to different roles. For example, shared users dashboard 250 shows different roles (owner, contributor, reviewer, approver) and an indication of which users have been assigned to which roles. A particular role may correspond to a particular access control level. For example, depending on a user's role, the use may have read-only access, read-write access, approval rights, permission to change the user's own permissions (e.g., role, access control level), permission to change or create another user's permissions (e.g., permission to share/unshare with another user), and/or the like.

In the embodiment illustrated in FIG. 2, user interface 200 includes conversation 225 in document collaboration communication pane 220. Conversation 225 may be accessible to the users represented by shared users dashboard 250, to members of some other group or channel, members of a chat session, and/or the like. In conversation 225, one user (e.g., an assignor)+@mentions 230 a second user (e.g., a recipient), which brings in the recipient to the document that is active in viewer pane 210. In some cases, sharing properties may be identified by default, based on a user input, and/or otherwise. For example, some default sharing properties may be applied based on a phase of a review cycle for the document (e.g., grant read-only rights in a review phase), based on a role of assignor (e.g., grant same rights as assignor during a creation phase), and/or others. In some cases, an access control gestures may provide temporary access that expire automatically (e.g., after a session such as a meeting or chat session ends, after some period of time, when a message or comment is deleted), for example, in case the assignor forgets to revoke access. In some cases, an assigner may only share permissions that the assignor has, and/or may need some higher level of permission that permits sharing.

Once +@mention 230 has been detected (e.g., upon sending the message), an access control list governing access to the document displayed in viewer pane 210 may be updated to grant the recipient access to the document based on the identified sharing properties, a notification may be sent to the recipient (e.g., including a link to the document), and/or shared users dashboard 250 may be updated to indicate the updated set of shared users. In some cases, an @mentioned user (e.g., a user granted temporary access) may be assigned to a corresponding role (e.g., users with temporary access), which may be depicted on shared users dashboard 250. Once the recipient has had a chance to perform the requested review, the assignor (or some other user) may -@mention 240 the recipient to remove the recipient from the document. Although the messages and @mentions in conversation 225 are depicted in the context of replies to a particular message, depending on the embodiment, access control gestures may or may not be operable in any message in conversation 225. For example, in some embodiments, access control gestures that remove access may be operable regardless of whether or not the gesture is embedded in a reply message. In other embodiments, access control gestures that remove access may only be operable in a reply to a message that grants access. This is just an example, and other variations may be implemented within the scope of the present disclosure.

Figure 3:
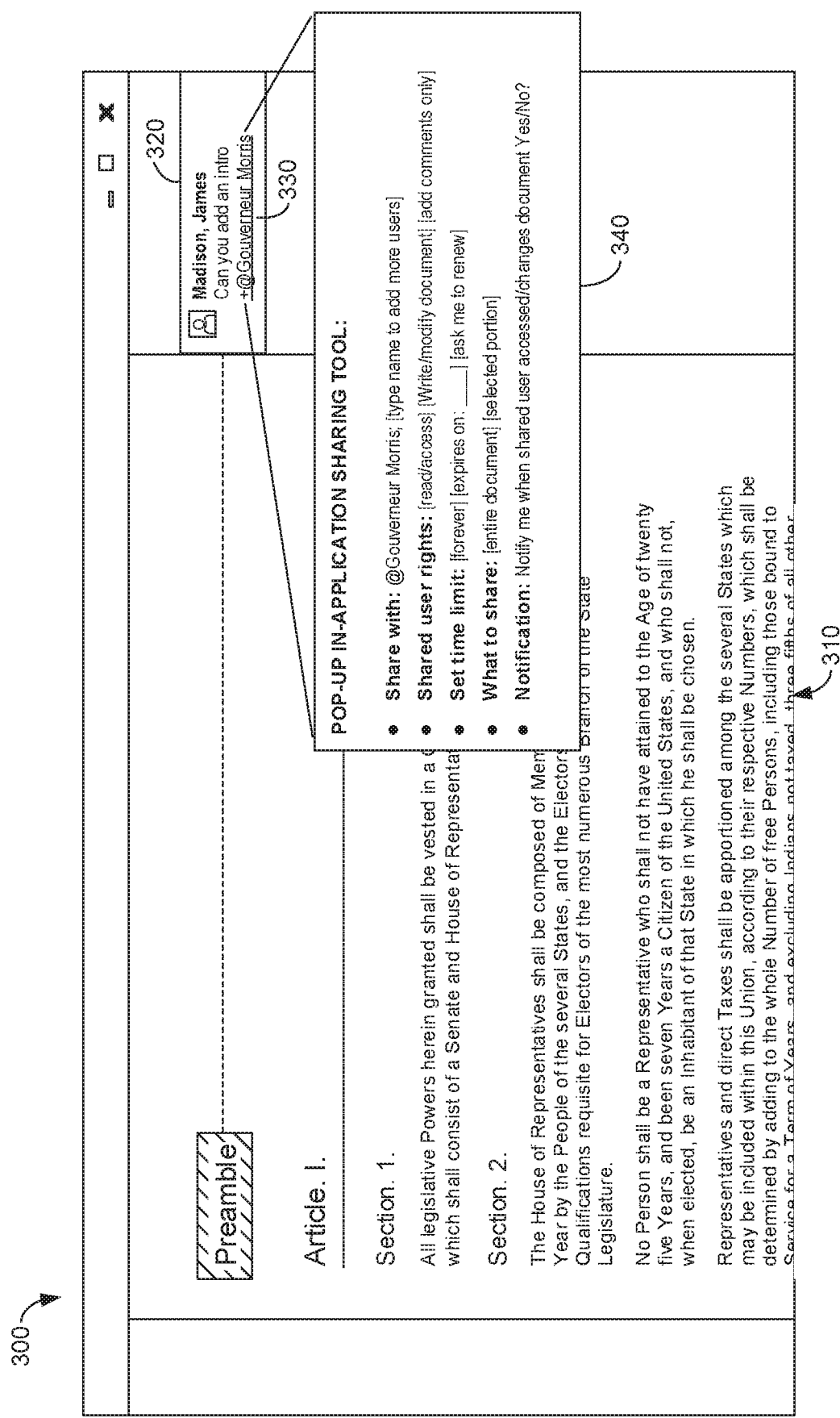
FIG. 3 is an illustration of an example user interface for modifying access control rules using document comments, in accordance with embodiments described herein.

FIG. 3 is an illustration of an example user interface 300 for modifying access control rules using document comments, in accordance with embodiments described herein. Generally, user interface 300 may be provided by an application such as application 110 of FIG. 1, which may in some embodiments correspond to a content creation application (e.g., MICROSOFT WORD, MICROSOFT EXCEL, MICROSOFT POWERPOINT). In FIG. 3, user interface 300 includes a document pane 310 configured to generate, edit, and/or view the contents of a selected resource (e.g., a file, document, web page, slide show, and/or the like). In this embodiment, user interface 300 may provide users with the ability to add comments to a document, or on a selected portion of an active document. For example, FIG. 3 illustrates an example comment 320. Comments in the document (e.g., comment 320) may be accessible to a group of users that have access to the document, the comments, and/or some portion or combination thereof, or to some other communication group associated with the document.

In comment 320, one user (e.g., an assignor)+@mentions 330 a second user (e.g., a recipient) to bring in the recipient to the document that is active in document pane 310. In some embodiments, upon detecting a sharing gesture or portion thereof (e.g., a command indicator such as "+@" or "-@"), a pop-up tool such as pop-up sharing card 340 may be presented. In the example illustrated in FIG. 3, pop-up sharing card 340 includes a presentation of various sharing properties (e.g., share with, shared user rights, set time limit, what to share, notification properties), corresponding (e.g., selectable, searchable, default) property values, and/or corresponding instructions (e.g., type name to add more users). Pop-up sharing card 340 is just an example of a possible interaction element that may be used to specify and/or confirm sharing properties. Generally, any type of interaction element may be used, including but not limited to graphics buttons, sliders, menus, prompts, alerts, alarms, vibrations, pop-up windows, notification-bar or status-bar items, in-app notifications, and/or others.

Generally, an access control gesture may be deemed completed in any suitable manner (e.g., upon closing pop-up sharing card 340, upon completing comment 320). In some embodiments, exiting a comment that includes a gesture may leave the comment as a draft, such that no action is executed until the comment has been finalized (e.g., upon inputting a confirmation to send or finalize the comment). Once the gesture indicated by +@mention 330 has been completed, an access control list governing access to the document displayed in document pane 310 may be updated to grant a designated recipient access to the document based on the identified sharing properties, and/or a notification may be sent to the recipient (e.g., including a link to the document). Once the recipient has had a chance to perform the requested review, the assignor (or some other user) may remove the recipient from the document in various ways (e.g., by deleting comment 320, by deleting +@mention 330, by -@mentioning the recipient, and/or other ways).

Turning now to FIG. 4, FIG. 4 is an illustration of an example resource table 410 that may govern access to computer resources, in accordance with embodiments of the present disclosure. Generally, access control rules for computer resources may be represented by a resource table or some other data structure(s) that maps computer resources to corresponding access control rules. In some cases, the access control rules may take the form of an access control list ("ACL"), which may indicate one or more authorized individuals (e.g., names or IDs), authorized users (e.g., a particular service or end user), authorized security groups, and/or access control levels needed to access a particular resource or group of resources. In the embodiment illustrated in FIG. 4, resource table 410 is illustrated with key-value pairs where a particular key indicates a resource ID 420 for a particular computer resource, and corresponding values 430 may include or otherwise identify (e.g., via references) the content or payload of the computer resource, one or more ACLs (e.g., ACL(s) 196) governing access to the computer resource, and/or or other metadata (e.g., timestamp). In this example, each record or entry in resource table 410 represents a particular computer resource that is mapped to contents of the resource (e.g., a payload), an ACL governing access to the computer resource, and/or metadata. For example, record 440 indicates resource ID 1 and its contents, and that access control level identifiers A and/or B are needed (i.e., user's access credentials must match A and/or B) to access the contents, in some embodiments.

Generally, access control rules (e.g., represented by resource table 410) may be accessible and/or configurable (e.g., by access control update component 180 of FIG. 1, by an administrator device such that an administrator may view and/or modify resource table 410). For example and with respect to FIG. 1, access control editing tool 130 of FIG. 1 may detect an access control gesture, and responsively may coordinate with access control update component 180 to execute a corresponding security command. For example, access control editing tool 130 may issue a query or otherwise cause access control update component 180 to access resource table 410, identify a record from resource table 410 corresponding to an identified resource (e.g., a document to share), and generate or update a corresponding ACL for the resource (e.g., to grant access to the document to a particular user). In some cases, updating an ACL to grant (or revoke) access to a particular user may involve adding an identifier or other representation of the user or group being added (e.g., to an ACL corresponding to the resource, to a particular access control level). In some cases, access control update component 180 may implement one or more sharing properties, enforce temporary access (e.g., update resource table 410 to revoke access), enforce restrictions on changing access control (e.g., preventing assignors from granting permissions that exceed the assignor's permissions), and/or the like. These are just a few examples, and additional or alternative ways of representing, accessing, monitoring, configuring, or otherwise implementing access control rights are contemplated within the scope of the present disclosure.

Example Flow Diagrams

Figure 5:
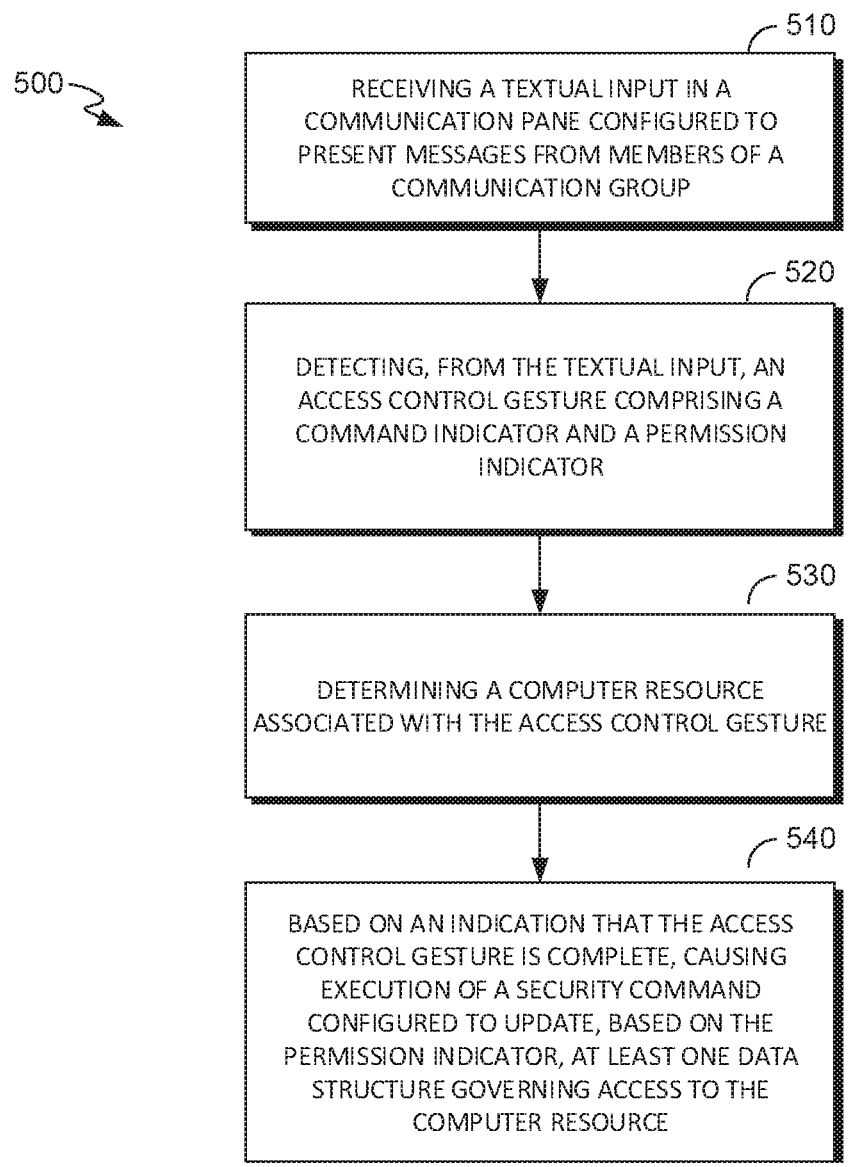
FIG. 5 is a flow diagram showing an example method for updating access to a computer resource based on textual input in a communication pane, in accordance with embodiments described herein.
Figure 6:
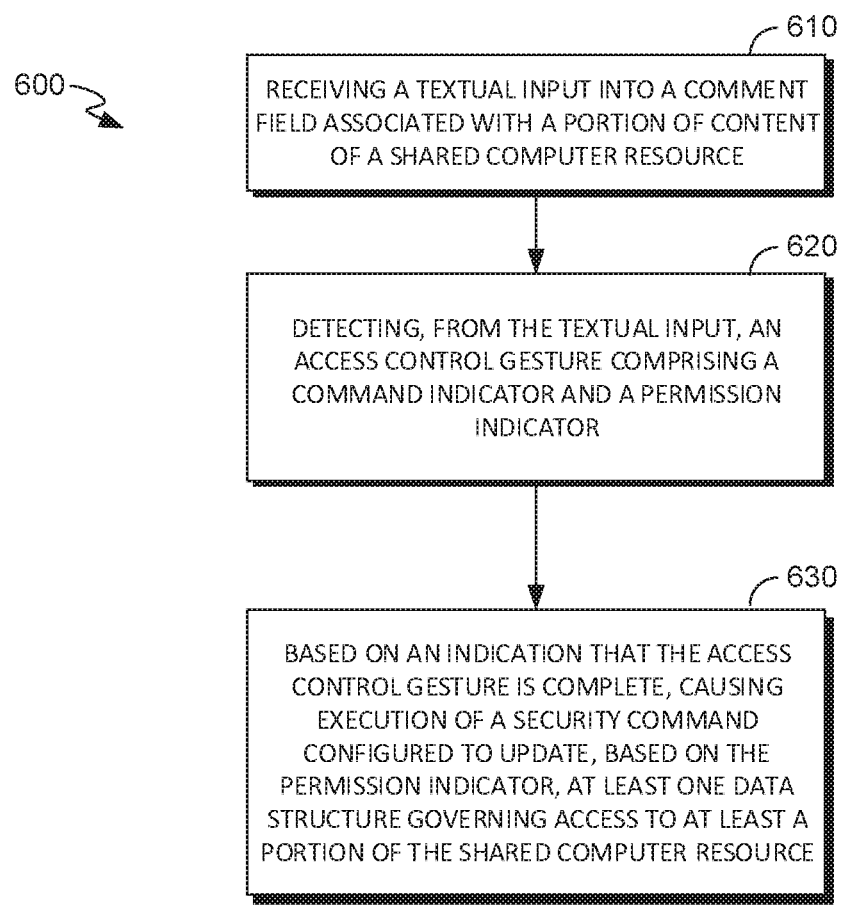
FIG. 6 is a flow diagram showing an example method for updating access to a computer resource based on textual input in a comment field, in accordance with embodiments described herein.

With reference to FIGS. 5 and 6, flow diagrams are provided illustrating methods for updating access to a computer resource. The methods can be performed using the resource sharing system described herein. In embodiments, one or more computer storage media having computer-executable instructions embodied thereon can, when executed by one or more processors, cause the one or more processors to perform the methods in the resource sharing system.

Turning now to FIG. 5, a flow diagram is provided that illustrates a method 500 for updating access to a computer resource based on textual input in a communication pane. Initially at block 510, a textual input is received in a communication pane. The communication pane is configured to present messages from members of a communication group. At block 520, an access control gesture is detected from the textual input. The access control gesture comprises a command indicator and a permission indicator. At block 530, a computer resource associated with the access control gesture is determined. For example, an associated resource explorer, content viewer, or content editor may be used to select an associated computer resource, or portion thereof. At block 540, based on an indication that the access control gesture is complete, a security command is caused to execute. The security command is configured to update, based on the permission indicator, at least one data structure governing access to the computer resource.

Turning now to FIG. 6, a flow diagram is provided that illustrates a method 600 for updating access to a computer resource based on textual input in a comment field. Initially at block 610, a textual input is received into a comment field associated with a portion of content of a shared computer resource. At block 620, an access control gesture is detected from the textual input. The access control gesture comprises a command indicator and a permission indicator. At block 630, based on an indication that the access control gesture is complete, a security command is caused to execute. The security command is configured to update, based on the permission indicator, at least one data structure governing access to at least a portion of the shared computer resource.

Example Operating Environment

Figure 7:
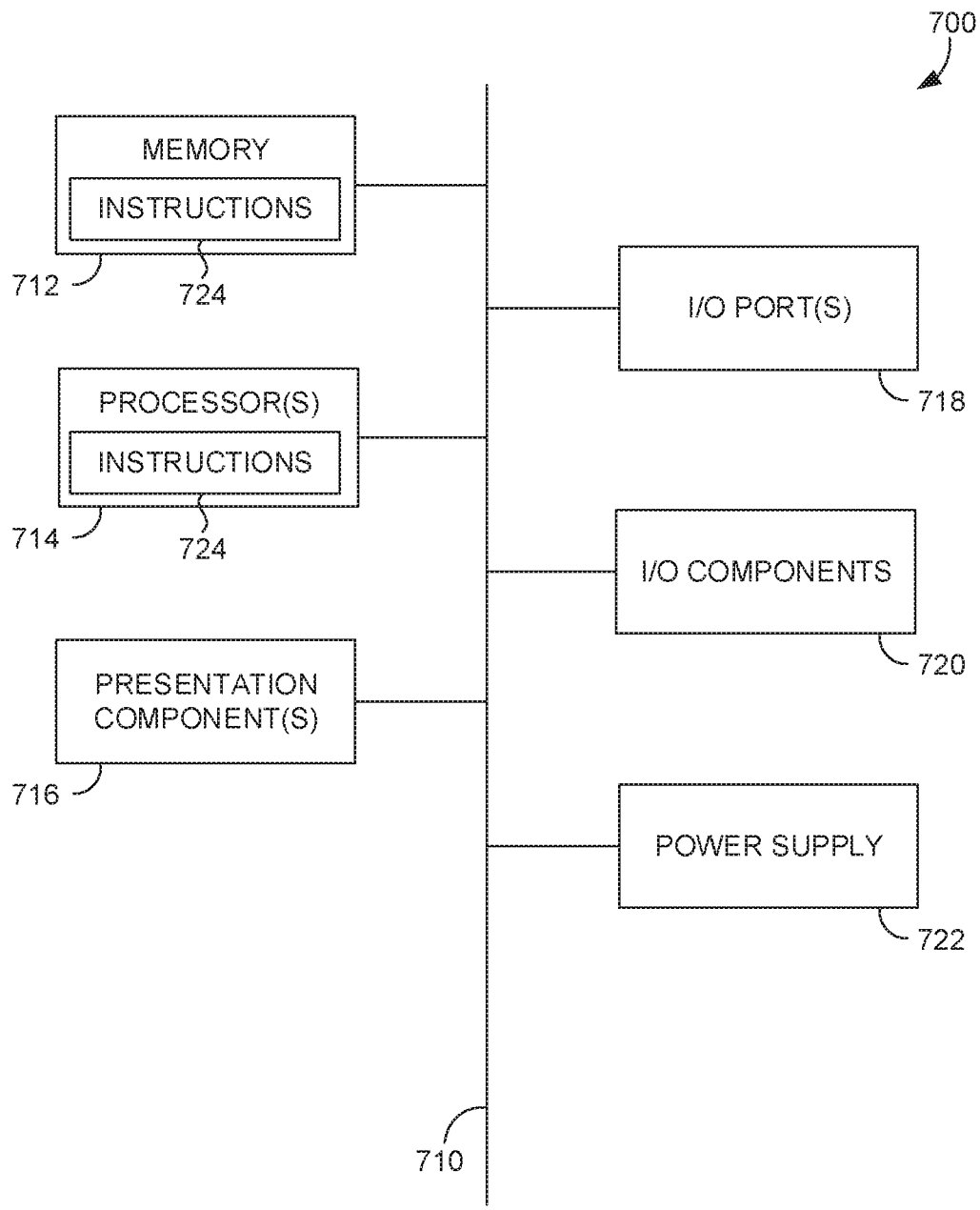
FIG. 7 is a block diagram of an example computing environment suitable for use in implementing embodiments described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 612 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the resource sharing environment described herein, embodiments described herein support sharing computer resources and modifying access control rules. The components of the resource sharing environment can be integrated components that include a hardware architecture and a software framework that support resource sharing functionality within a resource sharing system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the resource sharing system can include an API library that includes specifications for routines, data structures, object classes, and variables may support the interaction between the hardware architecture of the device and the software framework of the resource sharing system. These APIs include configuration specifications for the resource sharing system such that the different components therein can communicate with each other in the resource sharing system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention may be implemented at least in part in a distributed computing environment; however this need not be the case. Components can be configured for performing novel aspects of embodiments, where the term "configured for" can refer to "programmed to" perform particular tasks or implement particular abstract data types using code. Further, while embodiments of the present invention may generally refer to the resource sharing system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer system comprising:
at least one processor; and
at least one memory storing instructions that, when executed by the at least one processor, cause the at least one processor to perform operations comprising:
  receiving a textual input in a communication pane configured to present messages from members of a communication group;
  detecting, from the textual input, an access control input;
  determining a computer resource associated with the access control input, the access control input including:
    a command indicator identifying a target user; and
    a permission indicator comprising a predefined character associated with a security command for changing an access permission with respect to the determined computer resource; and
  executing the security command associated with the permission indicator to change the target user's access permission with respect to the computer resource.

2. The computer system of claim 1, wherein the communication group comprises a chat session and the textual input comprises a message in the chat session, the operations further comprising applying a search pattern to identify at least the command indicator from the textual input.

3. The computer system of claim 1, wherein determining the computer resource comprises identifying the computer resource as an active or selected file in an associated pane, distinct from the communication pane, upon the detection of the access control input.

4. The computer system of claim 1, wherein determining the computer resource comprises identifying the computer resource as a selected portion of content of an active file in an associated pane, distinct from the communication pane, upon the detection of the access control input.

5. The computer system of claim 1, wherein the command indicator comprises an @mention, the permission indicator comprises a plus sign, and the security command is configured to add the target user specified by the @mention to an access control list associated with the computer resource.

6. The computer system of claim 1, wherein the command indicator comprises an @mention, the permission indicator comprises a minus sign, hyphen, or dash, and the security command is configured to remove the target user specified by the @mention from an access control list associated with the computer resource.

7. The computer system of claim 1, the operations further comprising determining that the access control input is complete based on the textual input being sent to the communication group.

8. The computer system of claim 1, the operations further comprising causing display of a dashboard associated with the communication pane and presenting a representation of users with current access to the computer resource.

9. A method of operating a computing system, comprising:
receiving a textual input in a communication pane configured to present messages from members of a communication group;
detecting, from the textual input, an access control input;
determining a computer resource associated with the access control input, the access control input including:
  a command indicator identifying a target user; and
  a permission indicator comprising a predefined character associated with a security command for changing an access permission with respect to the determined computer resource; and
executing the security command associated with the permission indicator to change the target user's access permission with respect to the computer resource.

10. The method of claim 9, wherein:
the communication group comprises a chat session and the textual input comprises a message in the chat session, and
the method further comprises applying a search pattern to identify at least the command indicator from the textual input.

11. The method of claim 9, wherein determining the computer resource comprises identifying the computer resource as an active or selected file in an associated pane, distinct from the communication pane, upon the detection of the access control input.

12. The method of claim 9, wherein determining the computer resource comprises identifying the computer resource as a selected portion of content of an active file in an associated pane, distinct from the communication pane, upon the detection of the access control input.

13. The method of claim 9, wherein the command indicator comprises an @mention, the permission indicator comprises a plus sign, and the security command is configured to add the target user specified by the @mention to an access control list associated with the computer resource.

14. The method of claim 9, wherein the command indicator comprises an @mention, the permission indicator comprises a minus sign, hyphen, or dash, and the security command is configured to remove the target user specified by the @mention from an access control list associated with the computer resource.

15. The method of claim 9, further comprising determining that the access control input is complete based on the textual input being sent to the communication group.

16. The method of claim 9, further comprising causing display of a dashboard associated with the communication pane and presenting a representation of users with current access to the computer resource.

17. A non-transitory computer-readable medium comprising instructions that, when executed by a processor, cause the processor to control a system to perform:
receiving a textual input in a communication pane configured to present messages from members of a communication group;
detecting, from the textual input, an access control input;
determining a computer resource associated with the access control input, the access control input including:
  a command indicator identifying a target user; and
  a permission indicator comprising a predefined character associated with a security command for changing an access permission with respect to the determined computer resource; and executing the security command associated with the permission indicator to change the target user's access permission with respect to the computer resource.

18. The non-transitory computer-readable medium of claim 17:

the communication group comprises a chat session and the textual input comprises a message in the chat session, and the instructions, when executed by the processor, further cause the processor to control the system to perform applying a search pattern to identify at least the command indicator from the textual input.

19. The non-transitory computer-readable medium of claim 17, wherein determining the computer resource comprises identifying the computer resource as an active or selected file in an associated pane, distinct from the communication pane, upon the detection of the access control input.

20. The non-transitory computer-readable medium of claim 17, determining the computer resource comprises identifying the computer resource as a selected portion of content of an active file in an associated pane, distinct from the communication pane, upon the detection of the access control input.

* * * * *